(12) United States Patent
Lauwers et al.

(10) Patent No.: US 8,614,405 B2
(45) Date of Patent: Dec. 24, 2013

(54) METHOD OF MANUFACTURING A LINING ELEMENT

(75) Inventors: Olivier Lauwers, Yronde et Buron (FR); Arkadiusz Waszkiewicz, Olsztyn (PL)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 73 days.

(21) Appl. No.: 13/141,412

(22) PCT Filed: Dec. 21, 2009

(86) PCT No.: PCT/FR2009/052638
§ 371 (c)(1),
(2), (4) Date: Sep. 6, 2011

(87) PCT Pub. No.: WO2010/072960
PCT Pub. Date: Jul. 1, 2010

(65) Prior Publication Data
US 2011/0309230 A1    Dec. 22, 2011

(30) Foreign Application Priority Data
Dec. 24, 2008   (FR) ..................................... 08 59070

(51) Int. Cl.
*B22F 3/105*   (2006.01)
*B22F 5/00*   (2006.01)
*B28B 7/36*   (2006.01)

(52) U.S. Cl.
USPC ................................................... 219/121.85

(58) Field of Classification Search
USPC ........... 219/121.6, 121.85; 264/497; 225/1, 2; 419/1, 2, 6, 7, 8
See application file for complete search history.

(56) References Cited

U.S. PATENT DOCUMENTS

| | | | | |
|---|---|---|---|---|
| 4,553,918 A | * | 11/1985 | Yoda et al. ....................... | 425/46 |
| 4,988,479 A | * | 1/1991 | Nishikawa et al. ................ | 419/8 |
| 4,992,035 A | * | 2/1991 | Holroyd et al. ................. | 425/32 |
| 5,143,692 A | * | 9/1992 | van der Zel ...................... | 419/8 |
| 5,340,294 A | | 8/1994 | Kata | |
| 5,730,925 A | * | 3/1998 | Mattes et al. .................. | 264/497 |
| 5,906,835 A | * | 5/1999 | Triantafyllis ................... | 425/17 |
| 6,143,223 A | * | 11/2000 | Merino Lopez .............. | 264/219 |

(Continued)

FOREIGN PATENT DOCUMENTS

DE   102004028462 A1 * 12/2005
EP   0 523 958 A1   1/1993

(Continued)

OTHER PUBLICATIONS

Translation of Japan Patent No. 11-322,443, May 2013.*

(Continued)

*Primary Examiner* — Geoffrey S Evans
(74) *Attorney, Agent, or Firm* — Dickinson Wright PLLC

(57) ABSTRACT

Method of manufacturing a lining element intended to be attached to a support block of a tire mould, comprising the following steps: manufacturing, by selective melting of superposed layers of powder, of an intermediate element comprising the lining element and at least one local support element for locally supporting the lining element, the lining element and the local support element being produced as a single piece, separating the lining element from the support element.

9 Claims, 2 Drawing Sheets

(56) References Cited

U.S. PATENT DOCUMENTS

Figure 3:
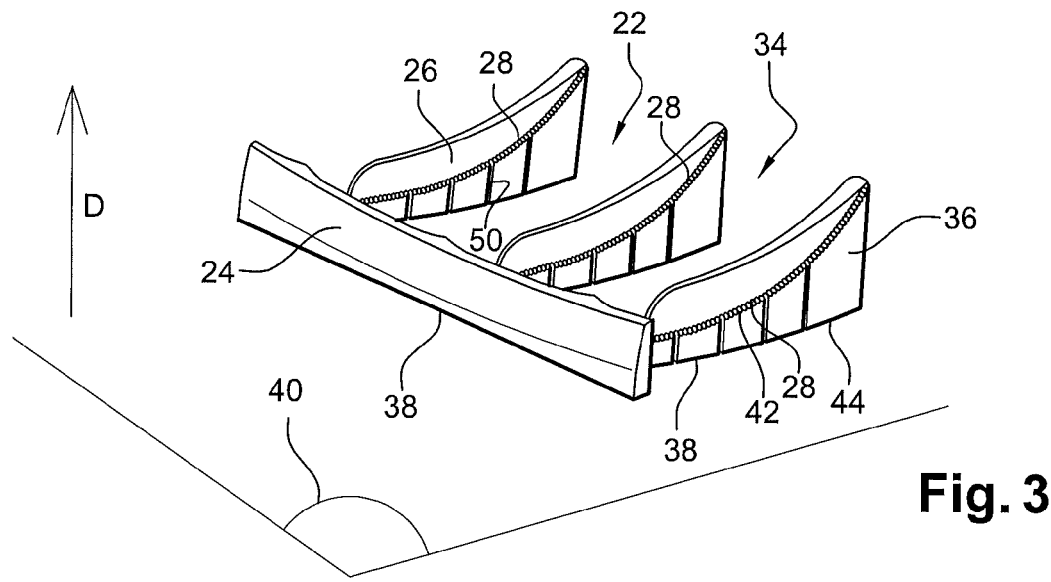

| | | | |
|---|---|---|---|
| 6,447,704 B1* | 9/2002 | Covino | 264/219 |
| 6,896,503 B1* | 5/2005 | Pinkawa et al. | 425/28.1 |
| 8,449,278 B2* | 5/2013 | Dusseaux et al. | 425/28.1 |
| 2001/0048182 A1* | 12/2001 | Caretta et al. | 264/337 |
| 2002/0041818 A1* | 4/2002 | Abe et al. | 419/7 |
| 2002/0187065 A1* | 12/2002 | Amaya et al. | 419/8 |
| 2003/0011106 A1 | 1/2003 | Osaki | |
| 2003/0205334 A1* | 11/2003 | Sherrill et al. | 156/581 |
| 2006/0186101 A1* | 8/2006 | Hagemeister et al. | 219/121.85 |
| 2006/0257511 A1* | 11/2006 | Iwamoto et al. | 425/35 |
| 2007/0187117 A1* | 8/2007 | Tanaka et al. | 172/1 |
| 2010/0090374 A1* | 4/2010 | Dietrich et al. | 264/497 |

FOREIGN PATENT DOCUMENTS

| | | |
|---|---|---|
| EP | 0 868 955 A1 | 10/1998 |
| EP | 1 277 554 A1 | 1/2003 |
| EP | 1 541 323 A1 | 6/2005 |
| EP | 1652644 A1 * | 5/2006 |
| EP | 1 719 598 A1 | 11/2006 |
| JP | 11-322443 A * | 11/1999 |

OTHER PUBLICATIONS

International Search Report (PCT/ISA/210) issued on Jul. 27, 2010, by French Patent Office as the International Searching Authority for International Application No. PCT/FR2009/052638.

\* cited by examiner

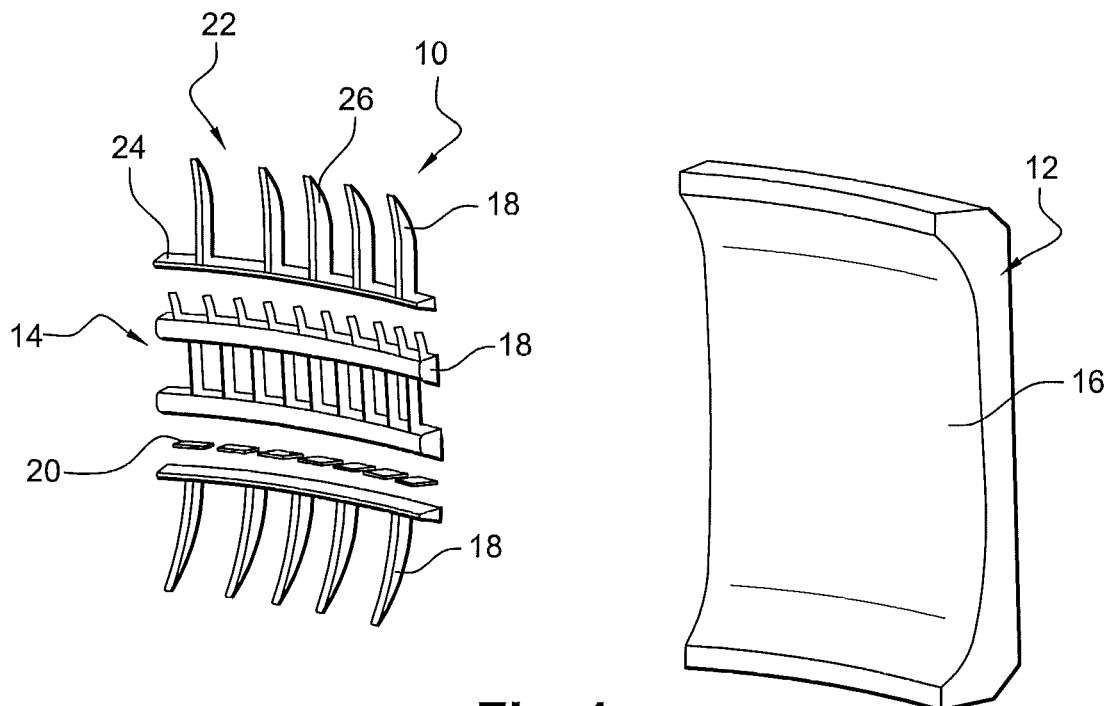
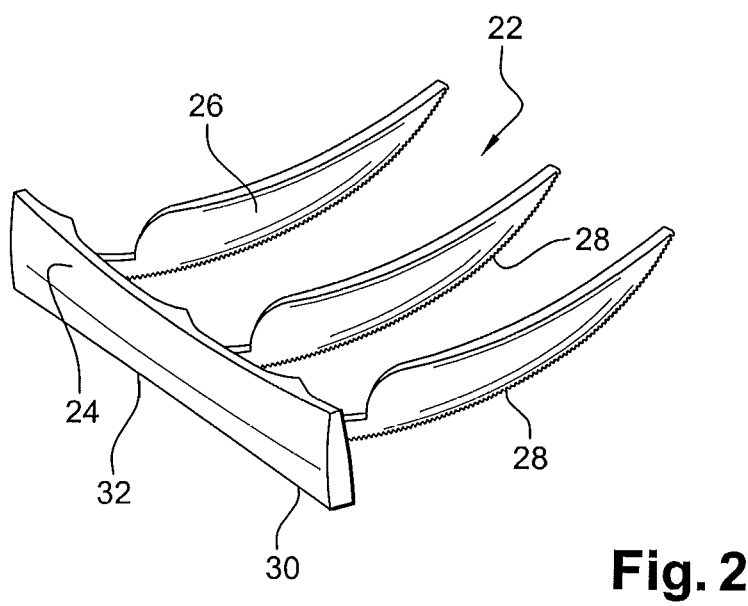
Fig. 1
Fig. 2

METHOD OF MANUFACTURING A LINING ELEMENT

The invention relates to the field of tire vulcanizing moulds, more particularly moulds of segmented type.

A segmented mould comprises several separate components which, when brought relatively closer together, delimit a near-toroidal molding space. In particular, a segmented mould comprises two lateral shells for molding the sidewalls of the tire, and several peripheral segments situated between the shells and for molding the tread band of the tire. All of these components are brought closer together with appropriate kinematics by using a suitable mechanism. The raw or green preform of the future tire needs to be pressed firmly and held against the mould in order to obtain geometric dimensions and a precise architecture, and in order to impart the tread band tread pattern.

To form the tread patterns of the tread band, the segments of the mould comprise elements projecting from the radially interior surface of the segments, these elements forming a negative of the tread patterns that are to be molded on the tread band of the tire.

In order for one and the same mould to be able to be used to manufacture tires with different designs of tread pattern, it is known practice, for example from document EP 0 523 958, for a mould segment to be made up of a number of elements: firstly a support block of a generic shape that defines the overall curvature of the tread band of the tire, and secondly a plurality of lining elements which are attached to the support block and are intended to form the tread patterns of the tire tread band.

The lining element described in that document is obtained by molding, for example by molding steel. It is therefore a solid and heavy element that is expensive to manufacture.

It is a notable object of the invention to propose a method of manufacturing a lining element that is more economical and simpler to implement.

To this end, a subject of the invention is a method of manufacturing a lining element intended to be attached to a support block of a tire mould, comprising the following steps:
  manufacturing, by selective melting of superposed layers of powder, of an intermediate element comprising the lining element and at least one local support element for locally supporting the lining element, the lining element and the local support element being produced as a single piece,
  separating the lining element from the support element.

The lining element is produced by selective melting of superposed layers of powder. When the selective melting is carried out using a laser, it is more commonly known as laser sintering. The benefit of this component manufacturing technique is that the shape of the component can be modeled by a computer and the component can easily be manufactured by sintering on the basis of this model. Specifically, the laser can be controlled by a computer containing a model of the component and the component can then be manufactured by the successive sintering of superposed layers of powder. In the case of the manufacture of a mould lining, this technique is particularly well suited because it allows small-sized lining elements such as blades or strips to be manufactured.

However, given that the lining element is intended to be attached to a support block of a mould for a tire, the curvature of which is substantially identical to that of the tire, it is necessary for the lining element to comprise a base surface that has a curvature that complements that of the support block. In other words, the base surface of the lining element is not planar but curved.

However, the laser sintering technique entails manufacturing the lining element layer after layer, superposing layers of melted powder on top of one another. A compacting means gives each layer of powder the desired density. The layers of melted powder are therefore planar layers.

In order to produce a lining element the base surface of which is curved rather than planar, it is therefore necessary in some instances for the upper layers to extend over a space that is larger than that defined by the lower layers, which means that some of the layers will jut out, with no support underneath them, particularly during the action of the compacting means. There is then a risk that the bonding-together of the layers will be of poor quality and that the lining element thus obtained will be defective.

The method of the invention makes it possible to get around this problem by the use of at least one local support element that locally supports the lining element to form an intermediate element. This support element is intended to be separated from the lining element after the laser sintering step.

The support element is designed to support those parts of the lining element that carry a risk of jutting out unsupported during laser sintering manufacture.

The lining element thus obtained is of very good quality and may have the desired shape, complementing that of the support block.

A method according to the invention may further comprise one or more of the following features:
  the support element is designed to support the lining element in a direction substantially parallel to the direction of superposition of the layers of melted powder. As already indicated, the layers of melted powder are superposed on one another in a direction of superposition. In general, the layers are substantially horizontal which means that the direction of superposition is substantially vertical. As a result, if parts of the lining element jut out unsupported, the forces imposed by gravity or by the mechanical action of the compacting means on the jutting-out parts are substantially vertical, and therefore parallel to the direction of superposition. It is therefore advantageous for the support element to be designed to support the lining element in a direction substantially parallel to the direction of superposition of the layers of melted powder.
  prior to separation, the local support element has one end in contact with the lining element and an opposite end belonging to a base layer of the layers of melted powder. What is meant by the base layer of the layers of melted powder is the first layer of melted powder, that is to say the lower layer on which the entirety of the sintered intermediate element rests. For the forces due to the unsupported jutting-out to be reacted by this base layer it is therefore preferable for the support element to connect the lining element to the base layer.
  the intermediate element comprises a substantially planar base surface. As the base surface is defined by the first layer of melted powder, it is substantially planar.
  each layer of melted powder is practically in its entirety situated in line with the melted layer directly below. In other words, the projection of a melted layer on the layer directly below, along the direction of superposition, is included inside the lower layer. There is then the assurance that no layer of the intermediate element juts out unsupported because each layer is wholly supported by the layer below.
  the intermediate element comprises means to make it easier to separate the lining element from the support element. Because the method comprises a step of separating the lining element from the support element, it is preferable for means to be provided to make this separation easier.

the means for making separation easier comprise a local reduction in thickness of the intermediate element, a partition that is thin by comparison with the thickness of the intermediate element, or a pre-cut in the intermediate element.

the lining element comprises a network of ribs, each rib being substantially normal to the planes defined by the superposed layers. The ribs of the lining element are intended to form grooves in the tread band of the tire.

the method further comprises a final step of polishing the surface of the lining element initially connected to the support element.

Another subject of the invention is an intermediate element obtained by implementing the method as defined hereinabove.

Figure 4:
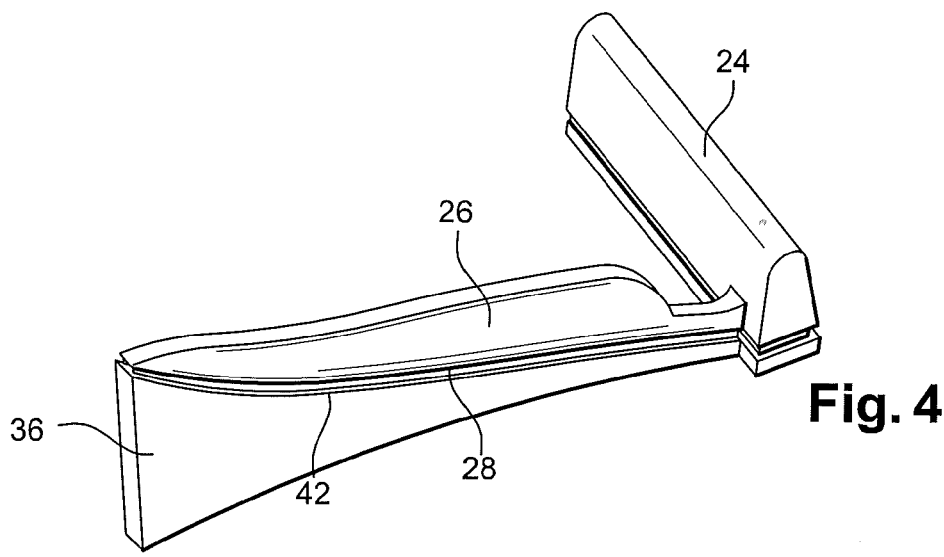
Figure 5:
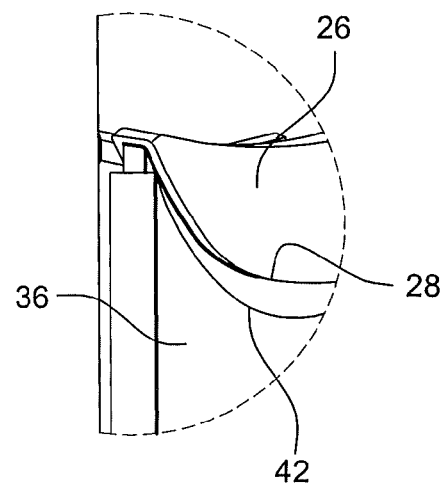

The invention will be better understood from reading the following description given solely by way of example with reference to the accompanying figures in which:

FIG. 1 is a perspective view of a segment of a vulcanizing mould for a tire, comprising a support block and a set of lining elements which have been obtained by implementing the method of the invention, FIG. 2 is a detail of a lining element depicted in FIG. 1, FIG. 3 is a perspective view of an intermediate element according to the invention, comprising the lining element of FIG. 2, FIG. 4 is a detail of the element of FIG. 3, FIG. 5 is a detail of the element of FIG. 4.

FIG. 1 depicts a segment, denoted by the overall reference 10, of a vulcanizing mould (not depicted) for a tire, at a preliminary stage in its manufacture.

A segmented mould for vulcanizing a tire comprises a plurality of segments identical or similar to the one depicted in FIG. 1. The segments are positioned one beside the other circumferentially, and thus define a cylinder in which to mould the tread band of the tire.

One given segment 10 is therefore intended to form part of the tread band of the tire.

The segment 10 comprises a support block 12 and a lining assembly 14 attached to the support block 12.

The support block 12, which is made, for example, of solid steel, notably comprises a radially interior surface 16 forming a support for the lining assembly 14. The surface 16 is substantially smooth and its overall shape is substantially identical to that of the part of the tire tread band that faces this support block during molding. In other words, the surface 16 has curvatures in a radial plane containing the axis of the tire and in a radial plane normal to the axis of the tire, these curvatures being substantially identical to those of the tire.

The lining assembly 14 comprises a plurality of lining elements 18 intended to form tread patterns in the tread band part of the tire, facing the segment 10. Various types of lining element 18 make up the assembly 14: for example, the assembly 14 as depicted in FIG. 1 comprises blades 20 directed substantially circumferentially with respect to the tire and intended to form grooves formed at the surface of the tread band, or combs 22 comprising a strip 24 directed circumferentially and a set of fins 26 directed axially with respect to the tire. The fins 26 are intended to form grooves situated at the edges of the tire tread band, in the shoulder region.

Most of the lining elements 18 are joined together and form a lattice, like the strips 24 with the fins 26 for example.

FIG. 2 depicts a detail of the comb 22. It may be noted that the fins 26 of the comb 22 comprise an edge 28 intended to come into contact with the surface 16 of the block 12. For that purpose the shape of the edge 28 of the fins 26 is curved and substantially complements the shape of the surface 16.

The strip 24 is substantially orthogonal to the fins 26 and extends in a circumferential direction of the mould. Thus, the strip 24 comprises a base 30 intended to come into contact with the surface 16 of the block 12, the base of the strip then comprising a curvature close to the circumferential curvature of the tire.

The assembly formed of the base 30 and of the edges 28 of the fins 26 forms a base surface 32 of the comb 22 which surface is intended to come into contact with the support block. This surface is not planar but has a curvature substantially identical to that of the surface 16 of the block 12.

The comb 22 that forms a lining element 18 is manufactured using the method of the invention by successive laser sintering of layers of powder, an intermediate stage being the manufacture of an intermediate element 34 depicted in FIGS. 3, 4 and 5.

The intermediate element 34 is produced as a single piece by laser sintering. This intermediate element comprises, firstly, the lining element 18, in this instance the comb 22, and secondly, support elements 36 which are arranged so that the intermediate element 34 comprises a base surface 38 that is included in an imaginary base plane 40. The base surface 38 is therefore planar and orthogonal to a direction D normal to the plane 40.

The intermediate element 34 is produced by selective melting of layers of powder that have been superposed in the direction D. The base surface 38 of the element 34 is the first layer melted.

Each support element 36 comprises an upper edge 42 in contact with the lower edge 28 of the fins 26 and an opposite lower edge 44 belonging to the base surface 38 of the intermediate element 34. The support elements 36 are in the form of a rib or vertical partition contained in a plane normal to the plane 40.

The support elements 36 are arranged so that any given section through the intermediate element 34, in a plane parallel to the base plane 40, is more or less entirely in line with any arbitrary section through the intermediate element situated between the given section and the base plane 40.

Thus, no part of the intermediate element 34 juts out unsupported in the direction D, unlike the lining element 22. In other words, every point on the intermediate element is supported in the direction D by a part of the element 34 which transmits the loadings onto the base surface 38.

To make it easier to separate the support elements 36 from the lining element 22, in this instance the comb 22, the join between the edge 28 of the lining element 22 and the upper edge 42 of the support element 36 comprises means designed to make this separation easier.

According to a first embodiment depicted in FIGS. 4 and 5, the separation means comprise a reduction in thickness of the partitions 36 where they join to the element 22. This reduction in thickness forms a break line for the intermediate element 34.

According to a second embodiment depicted in FIGS. 2 and 3, the join between the edge 28 of the lining element 22 and the upper edge 42 of the support element 36 comprises perforations which are contiguous along a pre-cut line. These perforations form pre-cut means. Further, vertical pre-cut lines 50 are also provided on the support elements 36 to make them easier to cut into several bits. After the cutting step, it may be necessary to abrade the edge 28 of the element 22 to eliminate any irregularities due to the pre-perforations.

The invention has been described in conjunction with a tire mould of the segmented type. Of course, the invention is not restricted to moulds of the segmented type but may be applied to any type of mould comprising a support block to which lining elements are attached.

Further, in the example described, the support elements are in the form of a partition or a rib. These elements could have any arbitrary shape, and notably be shaped as support pads.

Finally, in the example described, the entire lining element is supported by support elements, but support elements which support the lining element locally or at discrete points, which may be the case when the support element is a support pad, remain within the scope of the invention.

The invention claimed is:

1. A method of manufacturing a lining element having a curved base surface intended to be attached to a support block of a tire mould, comprising:

manufacturing, by selective melting of superposed layers of powder, of an intermediate element comprising the lining element having a curved base surface and at least one local support element for locally supporting the lining element along said curved base surface, the lining element and the local support element being produced as a single piece, separating the lining element from the local support element.

2. The method according to claim 1, wherein the support element supports the lining element in a direction substantially parallel to the direction of superposition of the layers of melted powder.

3. The method according to claim 1, wherein, prior to separation, the local support element has one end in contact with the lining element and an opposite end formed from a base layer of the layers of melted powder.

4. The method according to claim 1, wherein the intermediate element comprises a substantially planar base surface.

5. The method according to claim 1, wherein each layer of melted powder is practically in its entirety situated in line with the melted layer directly below.

6. The method according to claim 1, wherein the lining element comprises a network of ribs, each rib being substantially normal to the planes defined by the superposed layers.

7. The method according to claim 1, further comprising a final step of polishing the surface of the lining element initially connected to the support element.

8. The method according to claim 1, wherein the intermediate element comprises means to make it easier to separate the lining element from the support element.

9. The method according to claim 8, wherein the means to make it easier to separate the lining element from the support element comprises a region of local reduction in thickness of the intermediate element, a partition that is thin by comparison with the thickness of the intermediate element, or a pre-cut in the intermediate element.

* * * * *